United States Patent

Kuosmanen et al.

[11] Patent Number: 5,940,969
[45] Date of Patent: Aug. 24, 1999

[54] METHOD FOR CONTINUOUSLY BALANCING AND REDUCING THE ELASTIC ASYMMETRY OF A FLEXIBLE ROTOR, PARTICULARLY A ROLL OR A CYLINDER

[75] Inventors: Petri Olavi Kuosmanen; Pekka Tapio Väänänen, both of Espoo, Finland

[73] Assignee: Valmet Corporation, Finland

[21] Appl. No.: 08/750,005

[22] PCT Filed: Jun. 1, 1995

[86] PCT No.: PCT/FI95/00307

§ 371 Date: Nov. 27, 1996

§ 102(e) Date: Nov. 27, 1996

[87] PCT Pub. No.: WO95/33143

PCT Pub. Date: Dec. 7, 1995

[30] Foreign Application Priority Data

Jun. 1, 1994 [FI] Finland ..................... 942567

[51] Int. Cl.[6] ................. B23C 3/02; B23C 3/28; B23D 1/00
[52] U.S. Cl. ........................... 29/895.1; 29/895.3
[58] Field of Search ................... 29/263, 263.5, 29/895.2, 895.3, 895.32, 895.33, 33 T, 33 D, 895.1; 409/143, 135; 83/183, 191, 177; 427/425; 118/DIG. 10, 317

[56] References Cited

U.S. PATENT DOCUMENTS

| 3,755,646 | 8/1973 | Muller . | |
|---|---|---|---|
| 4,545,021 | 10/1985 | Suzuki et al. | 364/528.14 |
| 4,826,369 | 5/1989 | Bennett | 409/143 |
| 5,331,737 | 7/1994 | Järvelä . | |
| 5,368,423 | 11/1994 | Hanna | 409/143 |
| 5,397,291 | 3/1995 | Järvelä . | |

FOREIGN PATENT DOCUMENTS

WO 83/03457  10/1983  WIPO .................. 409/143

OTHER PUBLICATIONS

Patent Abstracts of Japan, vol. 9, No. 272, M–425, abstract of JP, A, 60–116945 (Yasukawa Denki Seisakusho K.K.), Jun. 24 1985 (06.24.85).

Patent Abstracts of Japan, vol. 5, No. 90, M–73, abstract of JP, A, 56–35836 (Hitachi Seisakusho K.K.), Apr. 8, 1981 (04.08.81).

*Primary Examiner*—Lee W. Young
*Assistant Examiner*—Bobby Rushing, Jr.
*Attorney, Agent, or Firm*—Rothwell, Figg, Ernst & Kurz, p.c.

[57] ABSTRACT

A method for improving rotation of a rotating roll body by reducing imbalance of the roll, reducing elastic asymmetry of the roll, or both, without increasing either, by forming one or more new grooves in the roll body or changing the size of one or more existing grooves.

12 Claims, 1 Drawing Sheet

FIG.1A PRIOR ART
FIG.1B
FIG.1C
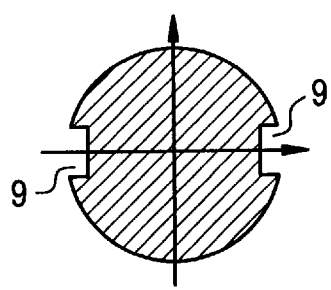
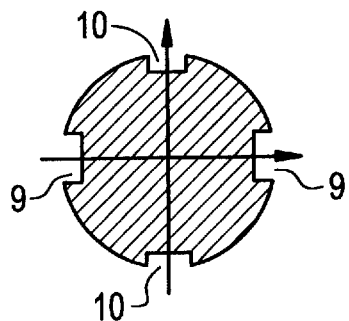
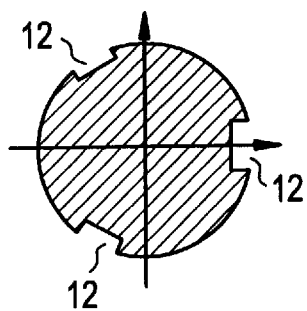
FIG.2
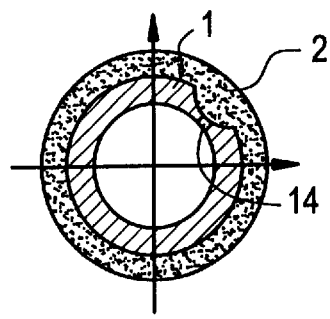
FIG.3
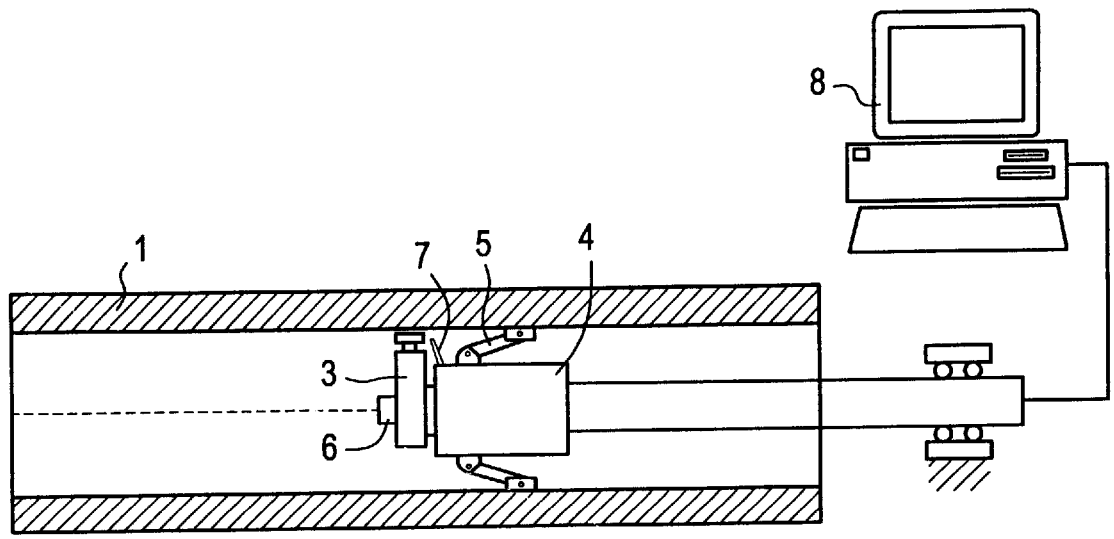

the elastic asymmetry of a flexible rotor, particularly a roll or a cylinder

BACKGROUND OF THE INVENTION

1. FIELD OF THE INVENTION

The present invention is in the field of improving rotation of a rotating roll body.

2. DESCRIPTION OF THE BACKGROUND ART

It is prior known that the elastic asymmetry of a roll is caused by axially extending grooves, material variations, wall thickness variations in a tubular-bodied roll or ellipticity of a roll.

It is prior known to reduce the imbalance and dynamic deflection of a roll by the addition of material: by securing weights or mass to the ends or in the middle of a roll, by injecting material to the light side of the inner periphery of a tubular roll.

It is prior known to reduce the imbalance and dynamic deflection of a roll by the removal of material: by drilling holes in the jacket of a roll, by internally turning a roll to a constant wall thickness or by aligning a roll in the turning of an outer surface according to the centre axis of a bore.

The rolls may be coated. The coated roll consists of an axle and a coating element which can be made of a paper or fabric fiber or a synthetic material or a combination thereof. The coated rolls are used in paper industry for example as calender glazing rolls and as various guide rolls. It is prior known to secure the positive attachment of a coating by providing the fiber-coated calender glazing rolls with one or two grooves (as an adhesive injection duct) or with a spline.

SUMMARY OF THE INVENTION

The present invention relates to a method for reducing the elastic asymmetry and imbalance of a flexible rotor, such as a roll, by machining material off the outer surface or inner surface of the roll by means of axially extending grooves or pockets, as well as to an apparatus for internal machining according to the method.

As for the alignment of rolls, it has been found out e.g. by the Applicants that the rolls are generally elliptical even after a successful alignment. The ellipticity is at its peak in the mid-section of a roll, reducing towards the ends of a roll in proportion to the sag of a roll. The calender glazing rolls, which are provided with diametrally located, axially extending adhesive injection grooves, have typically a measurable, distinct, elliptical circularity profile, having a size of 15–30 $\mu$m and an angle of 45° relative to the grooves included in the axle. The grooves cause elastic asymmetry which appears in the motion of the rotational centre axis of a roll in the form of two rotations as the roll does a single rotation. In machining, this results in an elliptical circularity profile as the turning tool remains stationary. In a calender, the elliptical rolls subject the calender to vibration and periodical nip pressure variation which is reproduced on a paper to be glazed. The elastic asymmetry is also known to be a significant source of known half-critical vibration, which appears when the roll has a rotating frequency which is half of the natural frequency of the transverse vibration of the roll.

An object of the invention is to provide a method capable of extending the service life of rolls and bearings included therein, increasing the running properties and running speed of a paper making machine or a calender, as well as improving the quality of paper by reducing the elastic asymmetry and imbalance of a roll. The measured elastic asymmetry or imbalance is compensated for by making grooves or pockets or by adjusting the size of previously machined grooves or pockets. According to a method of the invention, the grooves or pockets required in a roll due to the functional requirements of the roll are disposed at least in such a manner that, in any case, the grooves or pockets as such do not cause more elastic asymmetry or imbalance in the roll.

BRIEF DESCRIPTION OF THE DRAWINGS

A few exemplary embodiments of the invention will now be described in more detail with reference made to the accompanying drawings, in which FIG. 1 shows schematically in cross-section a calender fiber roll, including a) a current (prior art) generally used system, b) an improved system of the invention applicable to existing rolls, c) a system applicable to new fiber rolls.

FIG. 2 shows schematically a cross-section for a coated roll after forming the outer surface of a roll body (1) with a compensating groove according to a first embodiment of the invention, whereafter the body is coated with a coating (2) and machined to be circular.

FIG. 3 shows an apparatus according to a second embodiment of the invention for the internal machining of a tubular roll (1), the apparatus comprising a milling head (3) adjustable in radial and circumferential direction of the roll jacket, a body (4), bracing legs (5), a pulse sensor (6), a cutting fluid nozzle (7) and a control unit (8).

DETAILED DESCRIPTION OF THE INVENTION

Example of Embodiment 1

Removal of material off the outer periphery of a roll body.

A method for achieving the object of the invention can be applied to improving the operation of calender glazing rolls. The most convenient way is to provide the presently used rolls, including two adhesive injection grooves (9), with two more grooves (10) (FIG. 1b) for reducing the elastic asymmetry caused by the grooves (12) (shown in FIG. 1c). Three grooves are capable of achieving a very insignificant elastic asymmetry compared to what is caused by two diametrically located grooves of the same size. The use of four or more grooves provides no further essential advantage. The increased number of grooves also provides a more even passage of adhesive in between the coating and the body.

A method of the invention can also be used for balancing a roll by machining unequally sized grooves on the opposite sides of the roll. This does not essentially change the elastic asymmetry of a roll compared to the condition in which the grooves have equal cross-sectional areas.

Example of Embodiment 2

Removal of material off the inside of a tubular roll.

A method of the invention is not restricted to just removing material externally of the axle of a roll but, instead, a method of the invention can be used for balancing and eliminating the elastic asymmetry from tubular-bodied rolls by means of internal machining (FIG. 3). The machining is effected on the basis of measurements to find out the balance and elastic asymmetry of a roll to be machined. The measurements can be based for example on measuring the motion of the centre of the mid-section of a roll or on measuring the circularity profile or diametral variation after the machining operation.

This procedure may replace internal turning, which is an expensive and tedious process. A benefit gained by internal turning has been the reduction of a wall thickness and thereby an improved balance and lesser elastic asymmetry and thus also a lesser half-critical disturbance. A smooth inner tube surface resulting from internal turning is not usually exploited at all.

The removal of material off the inner surface of a tubular roll can be effected e.g. with an apparatus as shown in FIG. 3.

It is obvious that the invention is not limited to the above embodiments. The invention can be further supplied, as shown for example in FIG. 2, to improving the operation of tubular-bodied coated rolls by machining or milling material off the outer periphery of a roll body (1) at suitable spots such as compensating groove (14). The strict circularity and cylindricity requirements set on a roll are fulfilled after the coating (2) is applied and machine finishing.

The axially extending grooves can be used for compensating elastic asymmetry provided that the grooves are dimensioned such that the elastic asymmetry caused thereby is substantially equal to but oppositely directed to the elastic asymmetry of a roll.

We claim:

1. A method for reducing an elastic asymmetry of a flexible rotating roll body while maintaining or improving a dynamic imbalance deflection of said roll body, comprising removal of material from said roll body by forming at least one new groove or pocket on a circumferential surface of said roll body, said at least one new groove and any existing grooves being substantially symmetrically spaced about said circumferential surface of said roll body and being located between opposing ends of said roll body, or by changing the size of at least one previously formed groove or pocket in said roll body.

2. The method of claim 1 wherein said roll body comprises a load-bearing body and said roll body further comprises a coating element made of a material selected from the group consisting of paper fiber, fabric, synthetic material and a combination thereof, wherein said coating element is secured to said roll body so as to prevent movement of said coating element relative to an axle of said roll body.

3. The method of claim 1 further including the step of measuring said roll body to determine the imbalance and elastic asymmetry by a method selected from the group consisting of measuring motion of a center of a mid-section of said roll body, measuring a circularity profile of said roll body and measuring a diametral variation of said roll body.

4. The method of claim 1 wherein said at least one new groove is dimensioned such that elastic asymmetry caused thereby is substantially equal to, but oppositely directed to, elastic asymmetry of said roll body.

5. A method as set forth in claim 1, wherein said roll body includes after said machining at least three grooves or pockets parallel to said roll body and extending between said opposing ends of said roll body.

6. A method as set forth in claim 1, wherein said roll body, of a calender roll body to be upgraded and provided with two existing diametrically located grooves, is machined to include therein two additional grooves parallel to said body such that said existing grooves and said two additional grooves are positioned in circumferential direction at intervals of exactly or approximately 90°.

7. A method as set forth in claim 5, wherein said three axially extending grooves are positioned in a circumferential direction at intervals of exactly or approximately 120°.

8. A method as set forth in claim 1, wherein a calender roll body is provided with at least three axially extending keyways and splines for securing an adherence of a coating element.

9. A method as set forth in claim 1, wherein a paste to be injected between said calender roll body and a coating element is injected along at least three axially extending grooves.

10. A method as set forth in claim 1, wherein said removal of said material is effected at least at one spot off an outer surface of said tubular roll body before said roll body is coated with a coating.

11. A method as set forth in claim 1, wherein said roll body is a tubular roll body to be coated and a removal of material is effected at least at one spot from an inside of said tubular roll by means of an apparatus to be guided in through an end of said tube.

12. A method as set forth in claim 1, wherein said removal of material is effected at least at one spot from an inside of said tubular roll body by means of an apparatus of a miller type to be guided in through an end of said tubular roll body.

* * * * *